(12) United States Patent
Kaifu (10) Patent No.: US 6,798,453 B1
(45) Date of Patent: Sep. 28, 2004

(54) PHOTOELECTRIC CONVERSION DEVICE

(75) Inventor: Noriyuki Kaifu, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/192,370

(22) Filed: Nov. 16, 1998

(30) Foreign Application Priority Data

Nov. 19, 1997 (JP) ............................................. 9-318113

(51) Int. Cl.⁷ ............................ H04N 3/14; H04N 5/335
(52) U.S. Cl. ........................ 348/304; 348/308; 378/98.8
(58) Field of Search ................................ 348/304, 308; 378/98.8

(56) References Cited

U.S. PATENT DOCUMENTS

| | | | |
|---|---|---|---|
| 4,922,117 A | 5/1990 | Saika et al. ............... | 250/578.1 |
| 4,939,592 A | 7/1990 | Saika et al. ............... | 250/578.1 |
| 5,027,226 A | 6/1991 | Nagata et al. ............... | 358/482 |
| 5,060,071 A * | 10/1991 | Ino et al. .................. | 250/208.1 |
| 5,184,018 A | 2/1993 | Conrads et al. ......... | 250/370.09 |
| 5,262,649 A | 11/1993 | Antonuk et al. ........ | 250/370.09 |
| 5,264,939 A * | 11/1993 | Chang ......................... | 348/322 |
| 5,452,004 A * | 9/1995 | Roberts ....................... | 348/301 |
| 5,640,251 A * | 6/1997 | Tone et al. .................. | 358/449 |
| 5,677,940 A * | 10/1997 | Suzuki et al. .......... | 250/370.09 |
| 5,742,659 A * | 4/1998 | Atac et al. .............. | 250/370.01 |
| 6,005,911 A * | 12/1999 | Cheung ......................... | 378/37 |
| 6,163,386 A * | 12/2000 | Kobayashi et al. .......... | 348/304 |

FOREIGN PATENT DOCUMENTS

| | | | |
|---|---|---|---|
| EP | 0440282 | 8/1991 | |
| EP | 0660421 | 6/1995 | |
| EP | 0 667 711 | 8/1995 | |
| EP | 0 792 062 | 8/1997 | |
| EP | 0792062 A2 * | 8/1997 | ............ H04N/3/15 |
| JP | 4-212456 | 8/1992 | |
| JP | 8-116044 | 5/1996 | |

* cited by examiner

*Primary Examiner*—Andrew Christensen
*Assistant Examiner*—Nhan T Tran
(74) *Attorney, Agent, or Firm*—Fitzpatrick, Cella, Harper & Scinto (57) ABSTRACT

For accomplishing increase in S/N ratios, improvement in operability, and decrease of cost, a photoelectric conversion device comprises: a photoelectric conversion portion comprising a plurality of photoelectric conversion pixels arranged in row and column directions, a plurality of signal wires wired in the column direction, each of the signal wires connecting outputs of photoelectric conversion pixels arranged in the same column, and a plurality of control lines wired in the row direction, each of the control lines connecting control terminals for controlling signal output operation of photoelectric conversion pixels arranged in the same row; a plurality of analog memory means for storing analog voltages obtained from analog voltage conversion means for converting information charges based on the photoelectric conversion pixels to the analog voltages and for maintaining the analog voltages as outputs, each of the analog memory means being connected to each of the signal wires; and a plurality of A/D conversion means each connected to each output of analog switch means, each of the analog switch means being connected to each of a plurality of output line groups which are formed by dividing output lines of each of the analog memory means into a plurality of groups.

5 Claims, 10 Drawing Sheets

PHOTOELECTRIC CONVERSION DEVICE

BACKGROUND OF THE INVENTION

1. Field of the Invention

The present invention relates to a photoelectric conversion device for forming an image by visible light, radiation, or the like and, more particularly, to a photoelectric conversion device suitably applicable to a two-dimensional photoelectric conversion apparatus such as a still camera or an X-ray image pickup system.

2. Related Background Art

The conventional photography was mostly the silver salt photography using an optical camera and silver salt film. The development of the semiconductor technology has brought about development of an image pickup apparatus capable of taking images of moving picture, such as video camcorders, by a solid image pickup device using Si single-crystal sensors typified by CCD sensors or MOS sensors, but these images were inferior in the number of pixels and in S/N ratios to silver-salt photographs. Therefore, it was common practice to use the silver salt photography for taking still images with high quality.

On the other hand, demands are increasing in recent years for image processing by computer, storage of image in the form of an electronic file, and transmission of image by electronic mail. Under such circumstances, there are desires for electronic image pickup device capable of outputting a digital signal of an image comparable to those of the silver salt photography. This is not the case only in the field of ordinary photographs but also in the field of medical care.

The X-ray photography is popularly known as application of the silver salt photography technology in the field of medical care. This is the photography for exposing the affected part of a human body to X-rays emitted from an X-ray source and, for example, for determining whether a fracture or a tumor is present, based on information of X-ray transmission, which has been and is widely used long in medical diagnosis. Normally, X-rays transmitted by the affected part are made incident once to a fluorescent member to be converted into visible light; and the silver salt film is exposed to this visible light. The silver salt film has advantages of high sensitivity and high resolution, but also has disadvantages of taking some time for development, requiring much time and labor for storage and management, not allowing quick transmission of data to a remote place, and so on. There are thus desires for electronic X-ray image pickup device capable of outputting a digital signal of an image equivalent to those of the silver salt photography, as stated above. A suggestion to implement it was a method for forming an image by using a reducing optical system and a compact photoelectric conversion device using a single-crystal, such as the CCD sensors or the MOS sensors.

This method was, however, able to utilize only about one thousandth of light emitted from the fluorescent member and thus was still susceptible to improvement against the requirement that diagnosis should be made with as weak X-rays as possible where the human body was observed with X-rays. It is thus not easy to implement an X-ray diagnosis device for medical care by the compact photoelectric conversion device using the reducing optical system of poor light utilization efficiency.

In order to meet this requirement, development is under way of an image pickup apparatus using a large sensor with a two-dimensional array of image pickup devices using photoelectric conversion elements having hydrogenated amorphous silicon (hereinafter referred to as "a-Si"). The image pickup device of this type is constructed in such structure that a metal and a-Si are deposited in a desired order on an insulating substrate having each side of 30 to 50 cm by a sputtering apparatus, a chemical vapor deposition apparatus (CVD apparatus) or the like, for example, approximately 2000×2000 semiconductor diodes are formed therein, an electric field of a reverse bias is applied thereto, and charges flowing in the reverse direction in the respective diodes can be individually detected by a thin film transistor (hereinafter referred to as "TFT") made at the same time as the diodes. It is popularly known that when the electric field of the reverse direction is applied to the semiconductor diode, a photocurrent flows corresponding to a quantity of light incident to the semiconductor layer. The above device utilizes this phenomenon. However, a current, so called a dark current, flows even in a state in which no light is present at all and this gives rise to shot noise, which is the cause of degradation of detection capability of the overall system, i.e., degradation of the sensitivity called the S/N ratio. The point of development is thus how much this dark current can be decreased.

EP-A-0660421 discloses structural examples of X-ray image pickup systems for satisfying these requirements.

Figure 1:
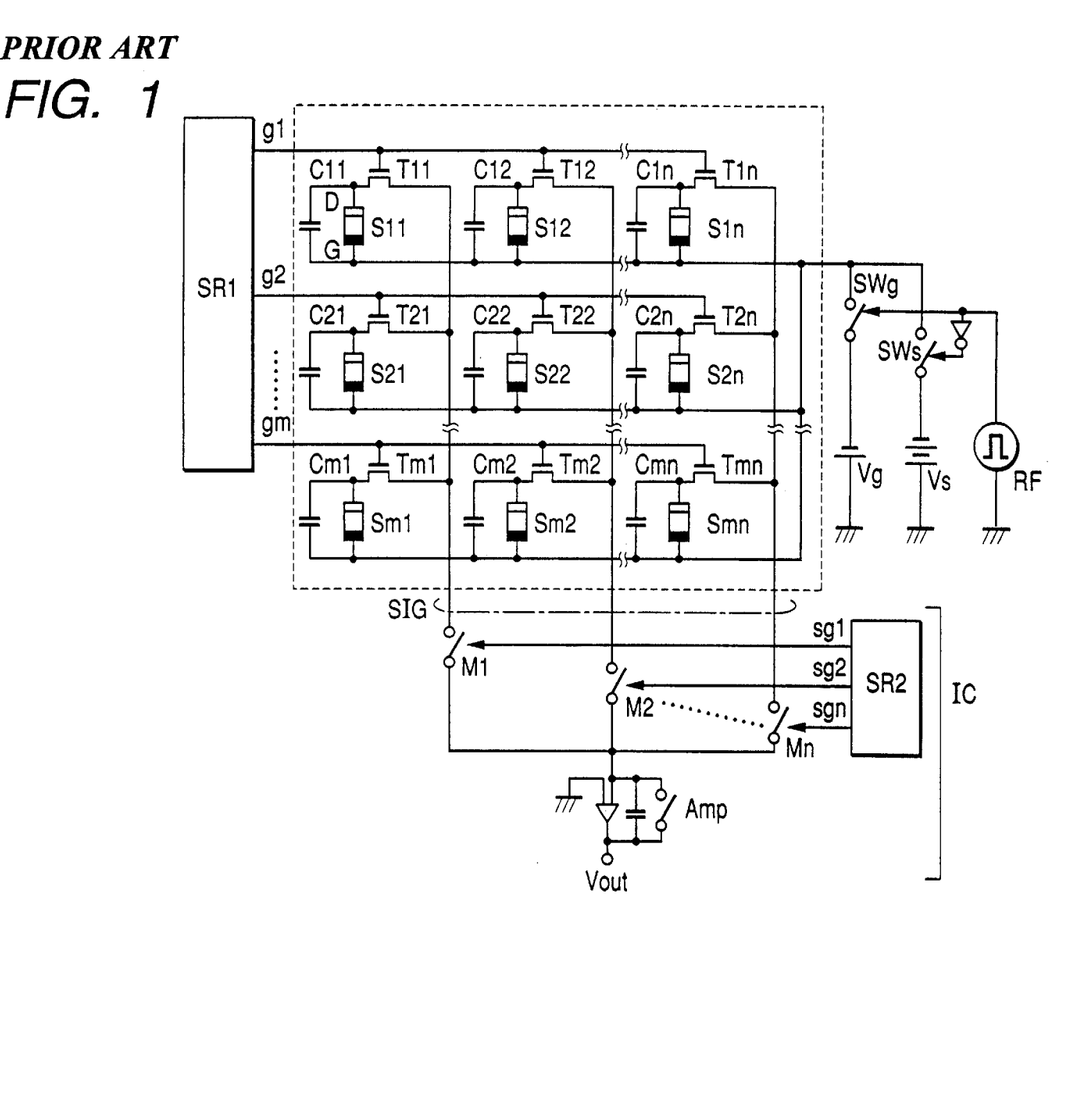
FIG. 1 is a schematic circuit diagram for showing an example of the photoelectric conversion device.
Figure 2:
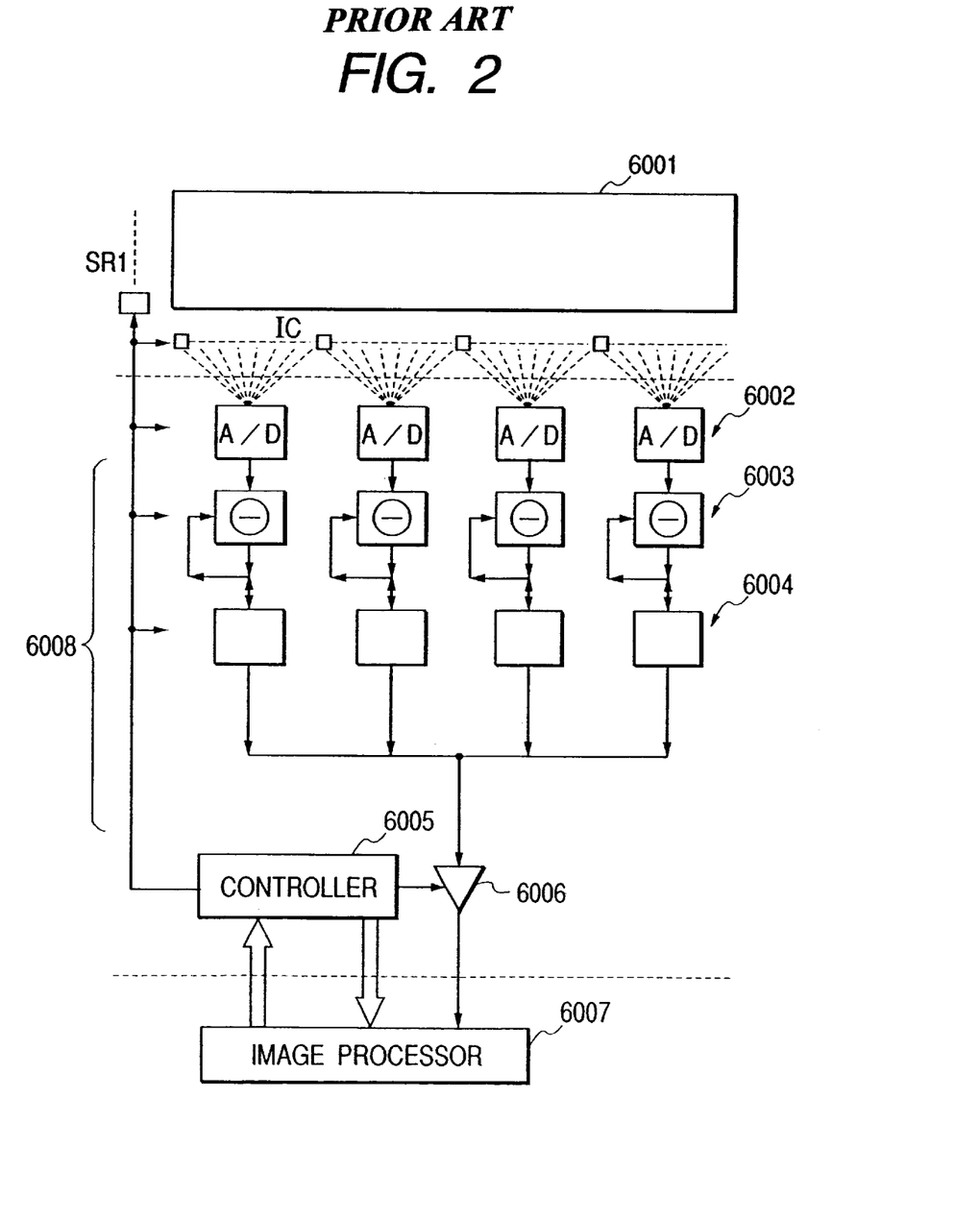
FIG. 2 is a schematic block sectional diagram for showing an example of the photoelectric conversion system.

FIG. 1 is a schematic circuit diagram of a photoelectric conversion device used in an X-ray image pickup system. FIG. 2 is a schematic block diagram of another X-ray image pickup system.

The above image pickup systems were, however, still susceptible to improvement against the requirements of higher S/N, better operability, and lower cost. The reasons will be described below with the examples of the image pickup systems of FIG. 1 and FIG. 2.

In FIG. 1, $S_{11}, S_{12}, \ldots, S_{mn}$ (m and n are positive integers) represent photosensors, $T_{11}, T_{12}, \ldots, T_{mn}$ (m and n are positive integers) switching elements such as thin film transistors, $C_{11}, C_{12}, \ldots, C_{mn}$ (m and n are positive integers) capacitor elements, and SR1 and SR2 shift registers. One pixel is composed of a photosensor $S_1, \ldots,$ or $S_{mn}$, a capacitor element $C_{11}, \ldots,$ or $C_{mn}$, and a switching element $T_{11}, \ldots,$ or $T_{mn}$, and the pixels are arranged in a matrix pattern. The switching element $T_{11}, \ldots,$ or $T_{mn}$ of each pixel is used for transmission of signal. Gates of the respective switching elements $T_{11}, \ldots, T_{mn}$ of pixels in each row are connected to a control line $g_1, g_2, \ldots,$ or $g_m$ (m is a positive integer), and the control lines $g_1, \ldots, g_m$ are connected to the shift register SR1. Each one main electrode of the respective switching elements $T_{11}, \ldots, T_{mn}$ of pixels in each column are connected to each signal line provided for every column. One electrode of each of the photosensors $S_{11}, \ldots, S_{mn}$ and one electrode of each of capacitor elements $C_{11}, \ldots, C_{mn}$ in each pixel are connected in common and then connected to a switch SWg and a switch SWs. The other electrode of each of the photosensors $S_{11}, \ldots, S_{mn}$ and the other electrode of each of capacitor elements $C_{11}, \ldots, C_{mn}$ in each pixel are connected to the other main electrode than the above one main electrode of each switching device $T_{11}, \ldots, T_{mn}$. Each signal line is connected to a switch M1, M2, . . . , or Mn (n is a positive integer), and the switches M1, . . . , Mn are successively driven by the shift register SR2 to output signals as outputs in order through an amplifier. Switches SWg and SWs are connected to desired power supplies Vg and Vs, respectively, and are driven so as to give a desired potential to the one electrodes of each of the photosensors $S_{11}, \ldots, S_{mn}$ and the one electrode of each of capacitor elements $C_{11}, \ldots, C_{mn}$ at desired timing.

In FIG. 2, numeral 6001 indicates a photoelectric conversion portion, 6002 an analog/digital signal converter for converting analog signals from the photoelectric conversion portion 6001 to digital signals, 6003 subtracters for correction of fixed pattern, 6004 a memory, 6005 a controller, 6006 a buffer, and 6007 an image processor. FIG. 2 shows a example in which a plurality of shift registers SR1 are arranged in series and a plurality of integrated circuits IC for detection are arranged. Outputs from the integrated circuits IC for detection are input to the analog-digital signal converters 6002 in the processing circuit 6008 to be digitized. Each digital output is supplied to the subtracter 6003 for correction of fixed pattern to remove unwanted fixed pattern noise therefrom, and then is stored in each memory 6004. The information stored in the memories 6004 is controlled by the controller 6005, and is transferred through the buffer 6006 to the image processor 6007 for signal processing to undergo image processing.

As the first problem, when pieces of information of n×m photoelectric conversion elements are obtained from the photoelectric conversion device in which m lines of n photoelectric conversion elements on each line are arranged, as in the example of FIG. 1, if n and m are not less than 1000, the operational speed of the A/D converter is not sufficient.

Although the A/D converter is not illustrated in FIG. 1, it is common practice to connect one A/D converter to Vout to convert an analog voltage to digital information. In order to obtain the digitized information from the information from the photoelectric conversion elements in this structure, some time is necessary for the A/D converter to convert the analog voltage outputted to Vout to the digital information. When Tad is defined as a time necessary for the A/D converter to obtain the digital information, the device needs the following time T(1 line) for obtaining n pieces of digital information from the pixels on one line, i.e., $T(1 \text{ line}) \geq n \times Tad$. In practice, the device further requires a time for turning the transferring TFTs Tx1 to Txn on and a time for successively turning the switches M1 to Mn on. Therefore, a furthermore time is necessary.

The device requires the following time T(1 frame) for obtaining information of one frame, i.e., $T(1 \text{ frame}) \geq m \times n \times Tad$. If n=m=2000, at least the time of 4,000,000×Tad is necessary for obtaining information of one frame. Since the time for analog-to-digital conversion of the A/D converter is normally 100 nsec to 1000 nsec, 0.4 second to 4 seconds are necessary for obtaining the information of one frame after all. This time is desired to be decreased in view of the desires for increase of S/N ratios and improvement in operability. This is because an accumulation time of dark current becomes long. Reading is started after completion of exposure to the photoelectric conversion elements. Supposing the reading takes four seconds, the dark current flowing during the period of four seconds would be accumulated in the photoelectric conversion element read last. This accumulation time of dark current is too long even with use of the photoelectric conversion elements having a small dark current described above, thereby giving rise to the shot noise. This will be the cause of degrading the detection capability of the overall apparatus, i.e., the cause of decrease of S/N ratios. When the reading takes four seconds, a reading takes at least four seconds. In that case, a patient must stop his breath with determination to stand still for four seconds or more. Therefore, improvement is demanded in terms of the operability.

A system using signal wires SIG divided to some groups and a plurality of A/D converters in order to improve this point is the system illustrated in FIG. 2. European Patent No. 0440282 discloses an device similar to such a system. These systems are, however, susceptible to solving the second and third problems described below.

The second problem is that in FIG. 1, before the switches M1 to Mn are successively turned on, the transferring TFTs Tx1 to Txn (x is a number selected from integers from 1 to m) have to be turned on to stabilize the potentials of the signal wires SIG. Since the A/D converter must convert an analog voltage to a digital signal during a period in which one switch My (y is a number selected from integers from 1 to n) is open, a time TM necessary for successively turning the switches M1 to Mn on is $TM \geq n \times Tad$. In practice, a more time is necessary, because the A/D converter is unoperatable during the period after switching from the switch My to the switch M(y+1) and before stabilization of the potential of Vout. This problem can be relaxed by using a plurality of A/D converters like the system of FIG. 2 described above and the device disclosed in European Patent No. 0440282. It is, however, necessary that the transferring TFTs Tx1 to Txn be turned on to stabilize the potentials of the signal wires SIG during the period between acquisition of digital information of one line and acquisition of digital information of a next line. When this time is defined as Ttft, the time T(1 line) for acquiring n pieces of digital information on one line is given as $T(1 \text{ line}) \geq TM + Ttft$.

The third problem is that, though the switches M1 to Mn are ideally to be turned on in order after the transferring TFTs Tx1 to Txn have been turned on to stabilize the potentials of the signal wires SIG, a small leakage current flows in the signal wires SIG in practice to decrease the signal charge during the successive switching-on operation of the switches M1 to Mn or to add an additional charge to the original signal, thereby lowering the S/N ratios. The transferring TFTs have a certain resistance even in an on state (so called "on resistance"), and this could make movement of signal charge instable. The decrease of S/N ratios is likely to occur when the time t is long from the turning on of the transferring TFTs Tx1 to Txn to the moment of the analog-to-digital conversion of information in the A/D converter through the switch My. If this time t is too short conversely, the on resistances of the transferring TFTs could also lower the S/N ratios. This means that there is a desired value of this time t for obtaining high S/N ratios.

On the other hand, in the method for successively turning the switches M1 to Mn on and converting information to digital data by the A/D converter through the switches My, the time t differs depending upon each of the photoelectric conversion elements Sx1 to Sxn. Specifically, the photoelectric conversion element Sx1 has a short time t from the turning on of the transferring TFT Tx1 to Txn to the moment of the analog-to-digital conversion of information by the A/D converter through the switch M1, whereas the photoelectric conversion element Sxn has a long time t from the turning on of the transferring TFTs Tx1 to Txn to the moment of the analog-to-digital conversion of information by the A/D converter through the switch Mn. This may cause such cases that information cannot be obtained in the desired time t for all the photoelectric conversion elements. This third problem is not a problem only in the device illustrated in FIG. 1, but may also be a problem arisen in such device that elements such as amplifiers exist before the switch group or so-called analog multiplexer, like the device shown in European Patent No. 0440282.

A solution to the first to third problems described above is a configuration in which n A/D converters are provided, the transferring TFTs Tx1 to Txn are turned on without using the switches My, and all the A/D converters are operated after a lapse of the desired time t to convert information to digital data. This is, however, difficult in practice where n is large, e.g., not less than 1000. Even if such a configuration can be implemented, a lot of expensive A/D converters will be used and thus raise the cost.

SUMMARY OF THE INVENTION

An object of the present invention is to provide a low-cost photoelectric conversion device with high S/N ratios and with good operability and a low-cost system capable of obtaining digital information with a large area and high S/N ratios necessary for the X-ray image pickup system or the like.

Another object of the present invention is to provide a photoelectric conversion device comprising:
- a photoelectric conversion portion comprising a plurality of photoelectric conversion pixels arranged in row and column directions, a plurality of signal wires wired in the column direction, each of signal wires connecting outputs of the photoelectric conversion pixels in one and the same column, and a plurality of control lines wired in the row direction, each of the control lines connecting control terminals for controlling signal output operation of the photoelectric conversion pixels arranged in one and the same row;
- a plurality of analog memory means for storing an analog voltage obtained from analog voltage conversion means for converting an information charge based on the photoelectric conversion pixels to the analog voltage, each of the analog memory means being connected to each of the signal wires; and
- a plurality of A/D conversion means each connected to each output of a plurality of analog switch means, each of the analog switch means being connected to each of a plurality of output line groups which are formed by dividing output lines of each of the analog memory means into a plurality of groups.

Another object of the present invention is to provide the above photoelectric conversion device wherein the analog voltage converting means and the analog memory means are connected to each of the signal wires.

Another object of the present invention is to provide the above photoelectric conversion device wherein when the plurality of output line groups are composed of N groups of output lines, the photoelectric conversion pixels are arranged in n columns, a conversion time of the A/D conversion means is Tad second, and a time for conversion of the information charge outputted from the photoelectric conversion pixels to the analog voltage through the analog voltage conversion means is Ttft second, the N satisfies the following condition:

$$N \geq n \times Tad/Ttft.$$

Another object of the present invention is to provide the above photoelectric conversion device wherein the N satisfies the condition of $n \times Tad/Ttft \leq N < n \times Tad/Ttft+1$.

Another object of the present invention is to provide the above photoelectric conversion device wherein the photoelectric conversion pixel has a photoelectric conversion element and a switching element for controlling the signal output operation of the photoelectric conversion element and wherein a control terminal of the photoelectric conversion pixel is a control terminal of the switching element.

DESCRIPTION OF THE PREFERRED EMBODIMENTS

The present invention will be described with reference to the drawings.

EXAMPLE 1

Figure 3:
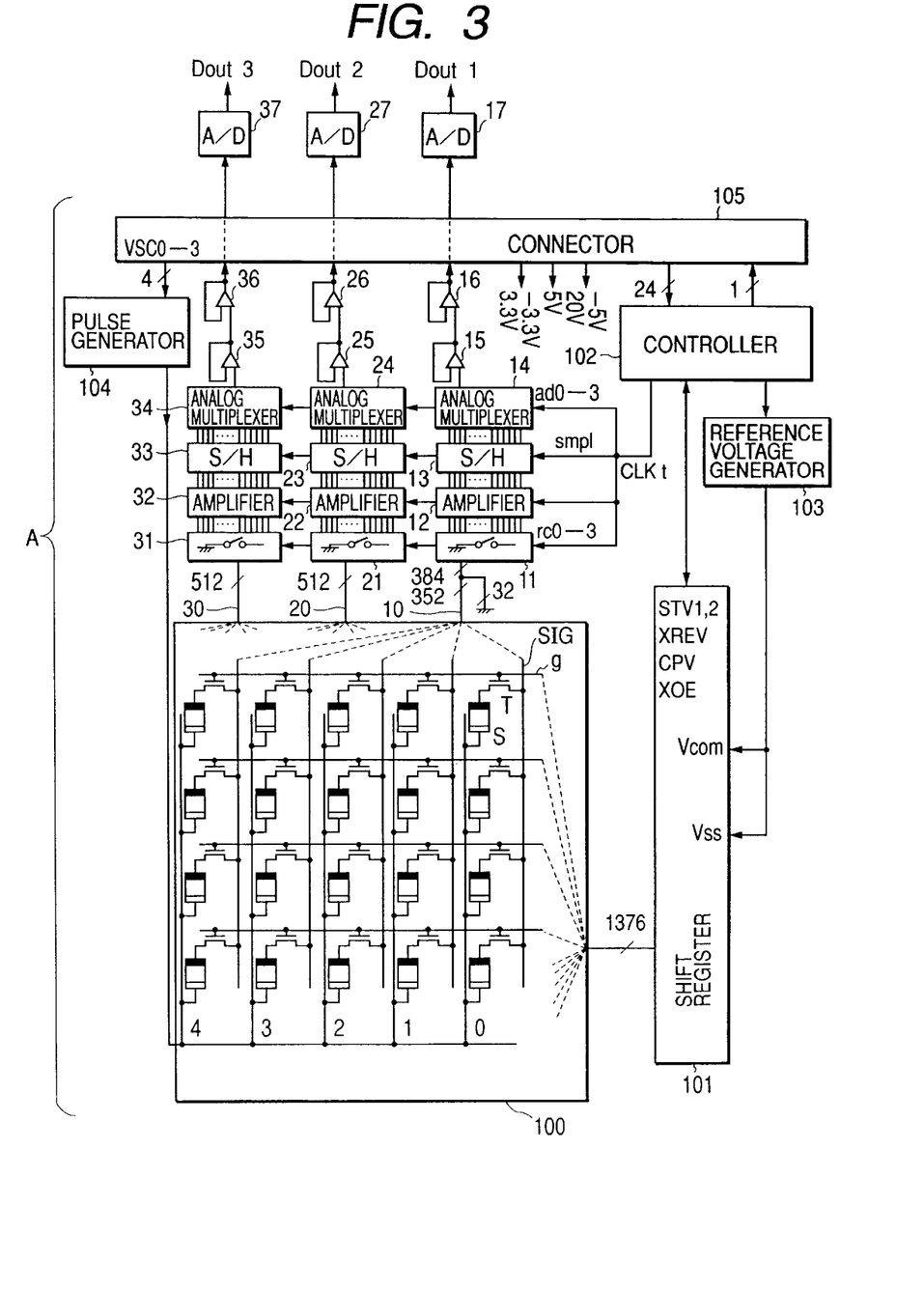
FIG. 3 is a schematic circuit diagram for explaining a preferred example of the photoelectric conversion device.

FIG. 3 is a schematic circuit diagram of the photoelectric conversion device according to the first example of the present invention.

As illustrated in FIG. 3, a pixel element group 100 of pixel elements constituting a photoelectric conversion portion are formed of amorphous silicon (a-Si) on an insulating substrate. One pixel element (a photoelectric conversion pixel) is composed of a sensor S as a photoelectric conversion element and a thin film transistor T as a switching element. The pixel element group 100 is composed of, for example, 1376 elements per row in the row direction (i.e., in the horizontal direction in FIG. 3) and 1376 elements per column in the column direction (i.e., in the vertical direction in FIG. 3), i.e., 1893376 pixel elements in total. Outputs of thin film transistors T in the pixel elements arranged on the same column are connected in common to a signal wire SIG, and control terminals of thin film transistors T arranged on the same row are connected in common to a control line g. Control lines g number 1376 in total and are connected to a shift register 101 to be turned on in order. When one control line g becomes on, 1376 thin film transistors T connected to that control line g become on, whereby information charges in the photoelectric conversion elements S connected to those thin film transistors T are transferred to the associated signal wires SIG. The signal wires SIG are grouped into three groups of signal wires, a first signal wire group 10 (352 wires), a second signal wire group 20 (512 wires), and a third signal wire group 30 (512 wires).

The first signal wire group 10 is connected together with thirty two dummy wires to a reset switch group 11 of 384 reset switches, an amplifier group 12 of 384 amplifiers, and a sample-and-hold circuit group 13 of 384 sample-and-hold circuits (hereinafter referred to as "S/H circuits"). Outputs of the 384 S/H circuits are connected in the form of an output wire group of 384 output wires to one analog multiplexer 14 being an analog switch. The analog multiplexer 14 selects one of outputs from the 384 S/H circuits 13 under control through nine address lines ad0 to ad8 to output a voltage thereof. This voltage is guided through amplifiers 15 and 16 to decrease its impedance to a lower value, and the analog voltage is outputted as digital information through a connector 105 from an A/D converter 17 to Dout1. As for the second signal wire group 20, the analog voltage is similarly outputted to Dout2 as digital information via circuit groups 21 to 23 of 512 sets of circuits, analog multiplexer 24, amplifiers 25 and 26, and A/D converter 27. As for the third signal wire group 30, the analog voltage is outputted similarly as Dout3 of digital information via circuit groups 31 to 33 of 512 sets of circuits, analog multiplexer 34, amplifiers 35 and 36, and A/D converter 37.

Each of the circuits is controlled and driven by signals of rc0 to rc3, smp1, and ad0 to ad8 from controller 102. This controller 102 generates four types of reset signals rc0 to rc3 and controls the switches in the reset switch groups 11, 21, and 31 every four switches in the column direction, thereby enabling thinning operation or alternating operation of four lines. A reference voltage generator 103 supplies on-voltage Vcom and off-voltage Vss for thin film transistor T via the shift register 101 under control of the controller 102. The shift register 101 can control the control lines g one by one, perform on/off control of plural lines at one time during the thinning operation, or turn on control lines placed at discrete positions. A pulse generator 104 supplies sensor bias pulses to a common electrode of the photoelectric conversion elements S. The pulse generator 104 generates four types of sensor bias pulses and supplies a common pulse every four lines in the column direction. This allows the thinning operation or the alternating operation of four lines.

An example of operation of the above photoelectric conversion device will be described below referring to FIG. 4 and FIG. 5.

Figure 4:
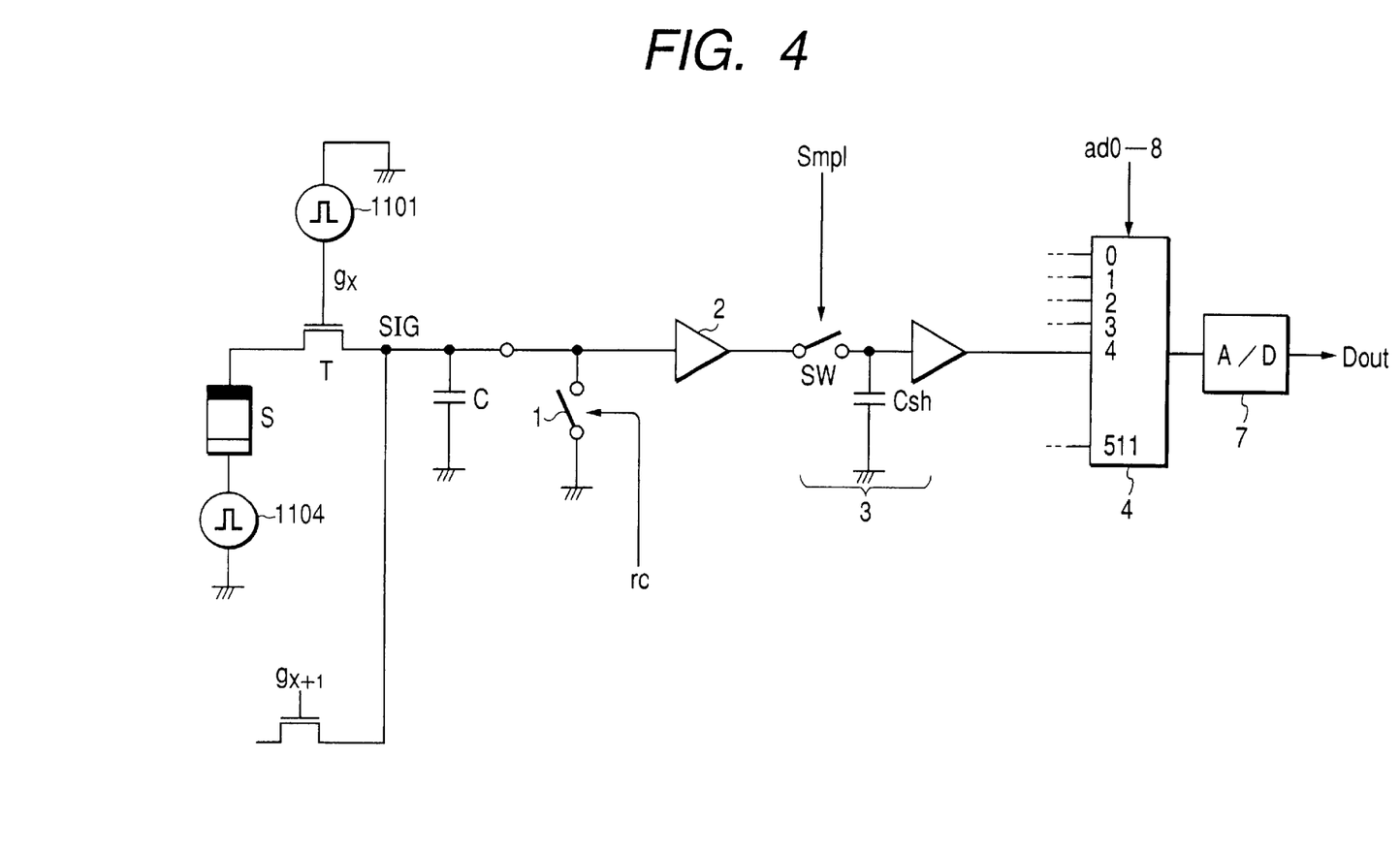
FIG. 4 is a schematic circuit diagram for explaining an example of operation of the photoelectric conversion device.

FIG. 4 typically shows one pixel element out of the pixel element group 100 in FIG. 3. In FIG. 4, reference character "SIG" represents one signal wire SIG in the signal wire groups 10, 20 and 30, numeral 1 one reset switch out of the reset switch groups 11, 21 31, numeral 2 one amplifier out of the amplifier groups 12, 22 and 32, numeral 3 one S/H circuit out of the S/H circuit groups 13, 23 and 33, numeral 4 one analog multiplexer out of the analog multiplexers 14, 24 and 34, and numeral 7 one A/D converter out of the A/D converters 17, 27 and 37. The amplifiers corresponding to the amplifiers 15 and 16 are omitted in FIG. 4 for simplification of explanation. Pulse 1101 schematically indicates one circuit in the shift register 101, and pulse 1104 schematically indicates one circuit in the pulse generator 104. In FIG. 4, gx (x is an integer selected from numbers of 0 to 1375) denotes one control line out of the 1376 control lines g. Further, reference character "rc" denotes one of the reset signals rc0 to rc3. Reference character "C" designates a capacitor formed in the signal wire. This capacitor C is not one formed as an element, but represents a stray capacitance of the 1376 thin film transistors connected to the signal wire. Further, the same components as those in FIG. 3 are denoted by the same reference characters.

Figure 5:
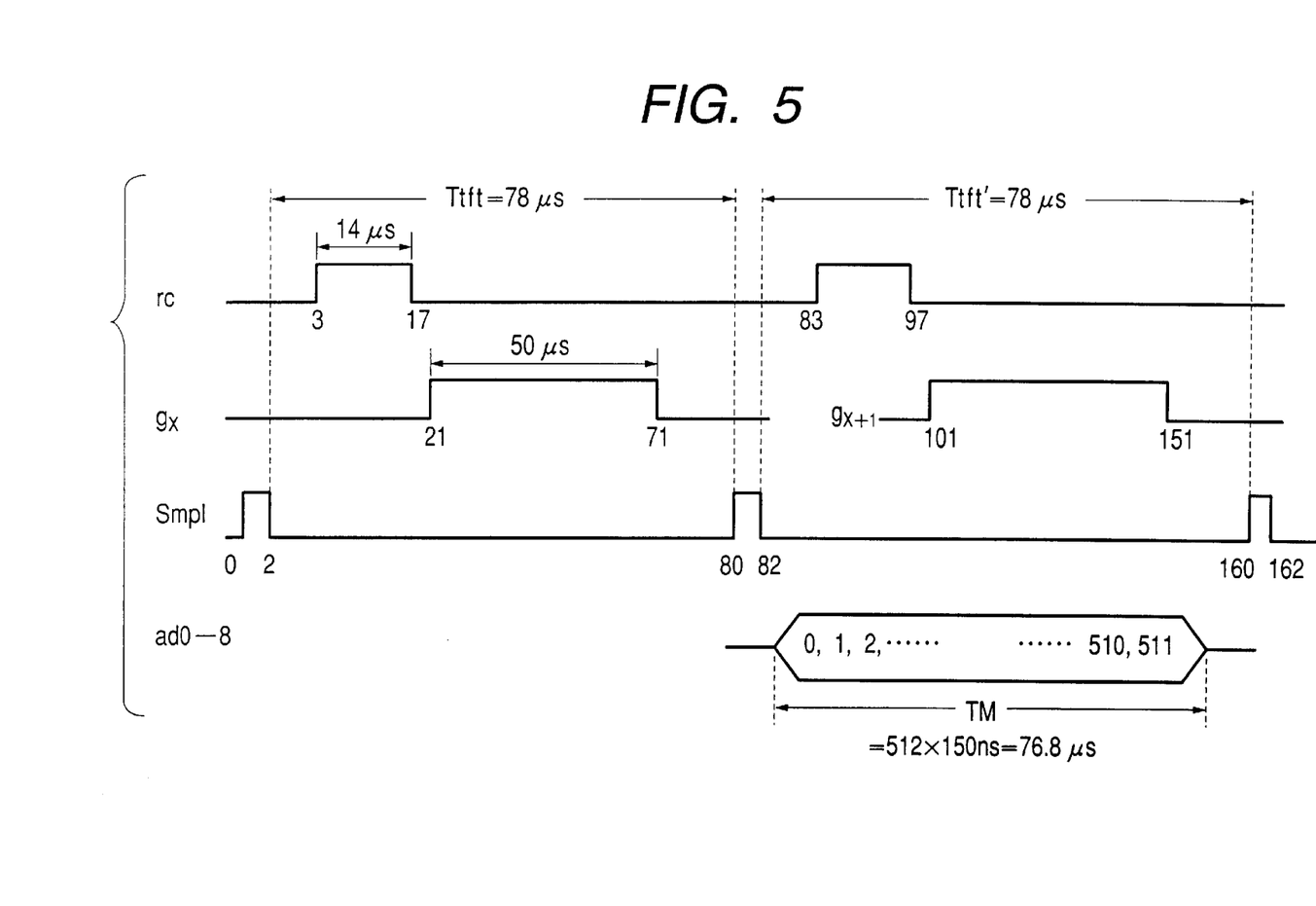
FIG. 5 is a schematic timing chart for explaining an example of operation of the photoelectric conversion device.

FIG. 5 is an example of time chart for showing the timing of control by the control line gx and the signals rc, smp1, and ad0 to ad8 in FIG. 4 and the timing of control by the control line gx+1 next turned on after the line gx, and the signals rc, smp1, and ad0 to ad8. Numbers given at pulse switch portions indicate respective times and one increment indicates a lapse of 1 $\mu$sec.

The operation of the circuit of FIG. 4 will be described referring to FIG. 5. First described herein is the operation of the 1376 pixel elements on one row. First, an on pulse is applied to rc to switch the reset switch 1 on. Then the charge in the capacitor C is initialized. Then rc is turned to the off level to switch the reset switch 1 off. After that, a pulse is applied to the control line gx to switch the thin film transistor T on, whereby an information charge in the photoelectric conversion element S is transferred through the thin film transistor T to the capacitor C. This is because the capacitance of the capacitor C is much larger than the capacitance in the photoelectric conversion element. The potential of the capacitor C is increased by the information charge. This is amplified by the amplifier 2 to be outputted as an analog voltage. Namely, the capacitor C, the reset switch 1, and the amplifier 2 function as an analog voltage converter for converting the information charge to the analog voltage. Another analog converter may employ a current integration type amplifier instead of the amplifier 2. In this case the reset switch 1 is located in an initializing circuit (normally at the both ends of a capacitor for integral charge accumulation) in the current integration type amplifier. This method has an advantage of being not affected by variation of the capacitor C.

Then the control line gx is turned to the off level to switch the thin film transistor T off and thereafter a pulse is applied to smp1 to switch the switch SW in the S/H circuit 3 on. This causes the analog voltage outputted from the amplifier 2 to be recorded as a voltage in hold capacitor Csh. This recorded voltage is not affected by change of the analog voltage outputted from the amplifier 2 after change of smp1 to the off level to turn off the switch SW. Therefore, the output of the S/H circuit 3 is maintained as a voltage. This output voltage is supplied from the analog multiplexer 4 to the A/D converter 7 at determined timing by a pulse of ad0 to ad8 to be outputted as digital information to Dout. During a period in which the output of S/H circuit 3 is maintained as a voltage and the information is processed in the A/D converter 7, the next thin film transistor T is turned on by pulses of rc and gx+1 and the next information is outputted as an analog voltage to the amplifier 2. The above described the operation of 1376 pixel elements on one row, and further digital data from the 1376 rows of pixel elements for one frame, i.e., 1376 columns×1376 rows=1893376 pixel elements, can be obtained by repeating this operation 1376 times with shifting the control line g to be turned on.

In FIG. 5, Ttft indicates the time necessary for converting the information charge in the photoelectric conversion element S to the analog voltage through the thin film transistor T and the converter (capacitor C, reset switch 1, and amplifier 2) by gx. Further, Ttft' indicates the time necessary for converting the next information charge by gx+1. Further, TM represents the time necessary for operating the multiplexer 4 and outputting the digital information of outputs of 512 S/H circuits to Dout by the A/D converter 7. In this example, Ttft=Ttft'=78 $\mu$sec and TM is 76.8 $\mu$sec (the conversion time Tad of the A/D converter is 150 nsec in this example). It is seen from this that Ttft>TM and that the reading speed of the photoelectric conversion device is determined by the time Ttft for converting the information charge in the photoelectric conversion element S to the analog voltage through the thin film transistor T and the converter (capacitor C, reset switch 1, and amplifier 2) by gx in the present example. In the present example, the signal wires SIG are grouped into the three groups of signal wires. If the signal wires SIG are grouped into two groups of signal wires, TM will be at least 103.2 μsec (1376/2×150 nsec) and the reading speed will thus be decreased. If the signal wires SIG are grouped into four groups of signal wires, TM will be only 51.6 μsec (1376/4×150 nsec), but since Ttft is 78 μsec, the reading speed is also 78 μsec, thereby showing no change. Therefore, the increase in the number of signal wire groups does not contribute to increase of the reading speed. In order to obtain the photoelectric conversion device with good operability and at low cost, the number of groups of the signal wires to be grouped is thus desirably determined in consideration of various conditions.

In the present example, information of each pixel element can be obtained in the constant time of Ttft of 78 μsec for all the pixels. Since Ttft is constant for all the pixels, influence of leakage current of signal wire SIG, if any, becomes constant for all the pixels, and thus correction thereof is easy. The voltage at a constant time 14 μsec after off of the thin film transistor T is converted to the digital information. Even if a voltage change in gx affects the signal wire SIG at the moment of off of the thin film transistor, this influence will be constant and can be reduced by correction or the like. If the S/H circuit were not provided and the voltage of the signal wire SIG thus had to be converted to the digital information after off of the thin film transistor, the operation for converting the analog voltage to the digital data by the A/D converter would not be allowed to be performed at the same time as the operation for converting the information charge in the photoelectric conversion element S to the analog voltage through the analog voltage converter (capacitor C, reset switch 1, and amplifier 2), unlike the operation of FIG. 5. Therefore, the long time of (Ttft+TM) will be necessary and the influence of the leakage current of signal wire SIG will differ depending upon the pixel elements in that case. Further, the influence of the voltage change in gx on the signal wire SIG at the moment of off of the thin film transistor will also differ depending upon the pixel elements.

Even if the present example is subject to sudden noise such as radiation noise or power-supply noise, noise included in the pixel elements in one row will be constant. The reason of this is as follows. Since the analog voltages of the 1376 signal wires SIG are processed at the same timing of turning of smp1 to the off level to switch the switch SW off, they are not affected by change of the analog voltage outputted thereafter from the amplifier 2, and the output of the S/H circuit 3 is maintained as a voltage. Namely, the elements in one row are affected only by noise at the same time. In the present example, the 1893376 pixel elements are arranged in 1376 rows and 1376 columns, the 1376 signal wires for reading of 1376 columns are grouped into the three groups, and the device is provided with the three analog switches and three A/D converters. Now, in other cases of the number of columns, the number of groups will be described bellow.

The following describes how to determine N to achieve maximum S/N, best operability and lowest cost when n columns of pixel elements are grouped into N groups.

When n columns are grouped into N, each group includes at least (n/N) signal wires SIG, and the time of not less than (n/N)×Tad is necessary for conversion of outputs thereof to digital information. Namely, there is the following relationship of TM≧(n/N)×Tad. Here, information of all the pixel elements needs to be converted to digital information as quick as possible in order to produce the photoelectric conversion device with high S/N and good operability. Therefore, the time for one column also needs to be minimized. However, Ttft is necessary for conversion of the information of the pixel element to the analog voltage of signal wire SIG. Since the operation for converting the information charge in the photoelectric conversion element S to the analog voltage is carried out at the same time as the operation for converting the analog voltage to the digital data by the A/D converter in the present example as illustrated in FIG. 5, the time necessary for reading of one column is a longer time selected from TM and Ttft. It is seen from the above equation that TM decreases with increasing N. Therefore, when Ttft≧TM, the photoelectric conversion device can be provided with high S/N and good operability. From the above two equations, the following equation is obtained.

$$Ttft \geq (n/N) \times Tad$$

Modifying this, the following equation is obtained.

$$N \geq n \times Tad/Ttft \quad (1)$$

When this equation is satisfied, the photoelectric conversion device can be produced with high S/N and good operability.

Here, a specific example will be described with numerical values. In the present example, N represents three groups, n 1376 columns, Tad 150 nsec (=0.15 μsec), and Ttft 78 μsec. Substituting these into the aforementioned equation, the right side gives the following.

1376×0.15 (μsec)/78 (μsec)=2.646 . . . Therefore, 3>2.646 . . . , and it is, therefore, seen that the photoelectric conversion device can be provided with high S/N and good operability.

When N is larger than 3, for example, N=4, TM becomes smaller, 51.6 μsec, but the time for one column is still Ttft. Therefore, it results in increasing the cost in vain.

For accomplishing the photoelectric conversion device with high S/N, with good operability, and of low cost, it is suitable to set N closest to (n×Tad/Ttft) while maintaining the relationship of N≧n×Tad/Ttft. For that purpose, N should be determined so as to satisfy the following.

$$N-1 < n \times Tad/Ttft$$

Modifying this equation, N can be determined so as to satisfy the following.

$$N < n \times Tad/Ttft + 1 \quad (2)$$

Describing this specifically with numerals, the right side is given as follows in the present example.

$$1376 \times 0.15 \ (\mu sec)/78 \ (\mu sec) + 1 = 3.646$$

Therefore, 3<3.646 . . . , and it is thus seen that the photoelectric conversion device with high S/N, with good operability, and of low cost can be obtained when N=3.

It is thus concluded that the low-cost photoelectric conversion device with high S/N and good operability can be obtained when the device satisfies the following equation which simultaneously includes Eq. (1) and Eq. (2) as described above.

$$n \times Tad/Ttft \leq N > n \times Tad/Ttft + 1$$

It is noted that Eq. (2) is not a condition for specifying the performance of the thin film transistors and A/D converters. Therefore, the photoelectric conversion device with high S/N and good operability can be implemented, for example, by using A/D converters of low cost and high speed (for example, Tad=100 nsec). It is, however, better to satisfy Eq. (2) in this case as well.

EXAMPLE 2

Figure 6:
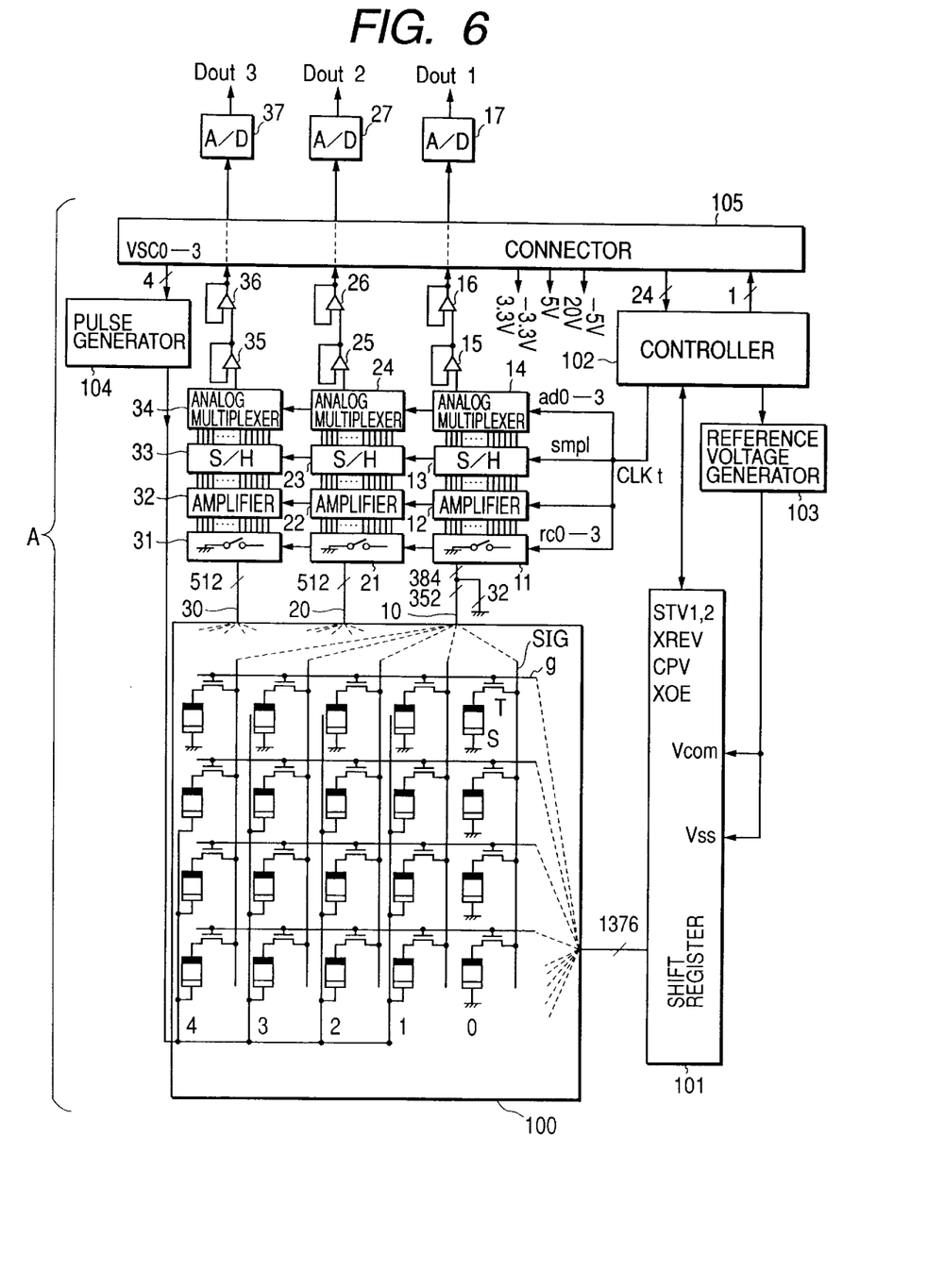
FIG. 6 is a schematic circuit diagram for explaining another preferred example of the photoelectric conversion device.

FIG. 6 is a schematic circuit diagram of the photoelectric conversion device according to the second example of the present invention.

The present example is different from the first example in that the one electrode of each of the photoelectric conversion elements in the first row and in the first column are connected to the GND potential and the photoelectric conversion elements in the first row and in the first column are used as reference elements. When the one electrode of a photoelectric conversion element is kept at the GND potential, the photoelectric conversion element becomes non-reactive to light. The photoelectric conversion element is, however, subject to the influence of leakage current of the signal wire SIG and to the influence of the voltage change in gx on the signal wire SIG at the moment of off of the thin film transistor. Information of high S/N can be obtained by subtracting the information obtained from these first-row elements from the information of the other pixel elements. At this time, 1376 pieces of information can be stored to be used as correction values for information of pixel elements from a corresponding column. However, an average of the 1376 pieces of information of the first row is stored to be used as a correction value for information of each pixel element, for simplifying the circuitry. This is because the present example is configured so as to make constant the influence of the leakage current of signal wire SIG of each pixel element and the influence of the voltage change in gx on the signal wire SIG at the moment of off of the thin film transistor. The reason of this was described in the first example. Since the memory stores only the average of the 1376 pieces of information, the memory can be of a small scale and low cost.

When the information obtained from the first-column elements is used as correction values for information of pixel elements from corresponding rows, the information can be obtained with much higher S/N by subtracting it from the information of each pixel element. The reason is as follows. The radiation noise and power-source noise, which could be the cause of degradation of S/N, also affects the elements in the first column, and no optical information is included in the devices of the first column. Therefore, the optical information of each pixel element can be obtained with high S/N by subtracting the information of the first-column element from the information of each pixel element. This is because the elements in one row are subject to constant noise in the present example. The reason of this was already described in the first example.

The present example employs the structure that the one electrode of each of the photoelectric conversion elements in the first row and in the first column are connected to the GND potential and they are used as reference elements. But, the present invention is not limited to this, the photoelectric conversion elements may also be adapted for the reference elements, for example, in such structure that the photoelectric conversion elements in the first row and in the first column are connected under the same connection as the other pixel elements but are made to be optically unaffected by light. For example, a black organic film is placed on the pixel elements of interest to shield them. In the case of the photoelectric conversion device for detection of X-ray, a member such as a lead plate may be placed before or after an object to be exposed to X-ray. The pixel elements in two or more rows and in two or more columns may also be used as reference elements instead of those in one row and in one column. For example, many rows and many columns may be used, such as 100 rows and 100 columns. This configuration has the effect of easiness of optical shielding and can decrease errors due to the influence of variation in the leak current of the pixel elements and variation in various characteristics of the converters for reading, by averaging the noise of the reference elements themselves. Each of the effects can also be achieved even by use of the reference elements only in the row direction or only in the column direction.

EXAMPLE 3

Figure 7:
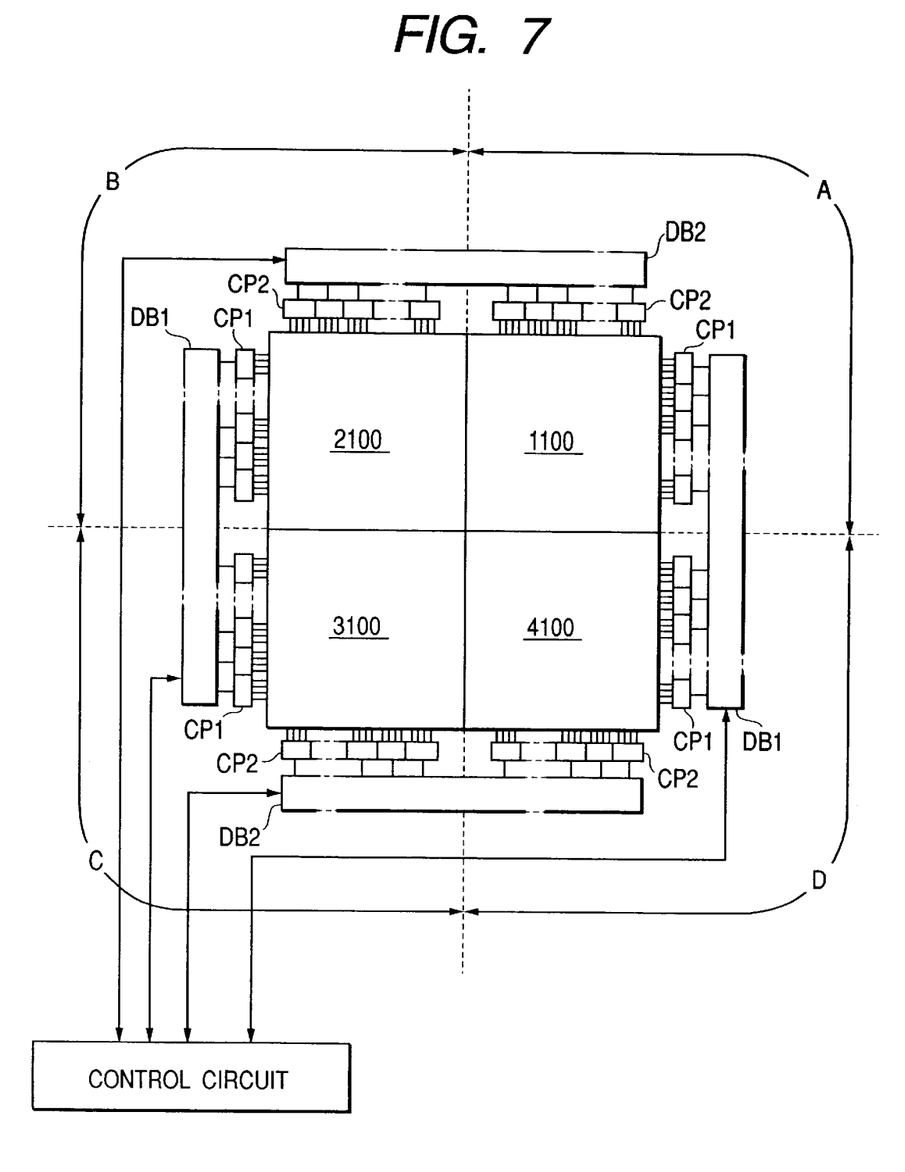
FIG. 7 is a schematic layout diagram for explaining a preferred structural example of the photoelectric conversion device.
Figure 8:
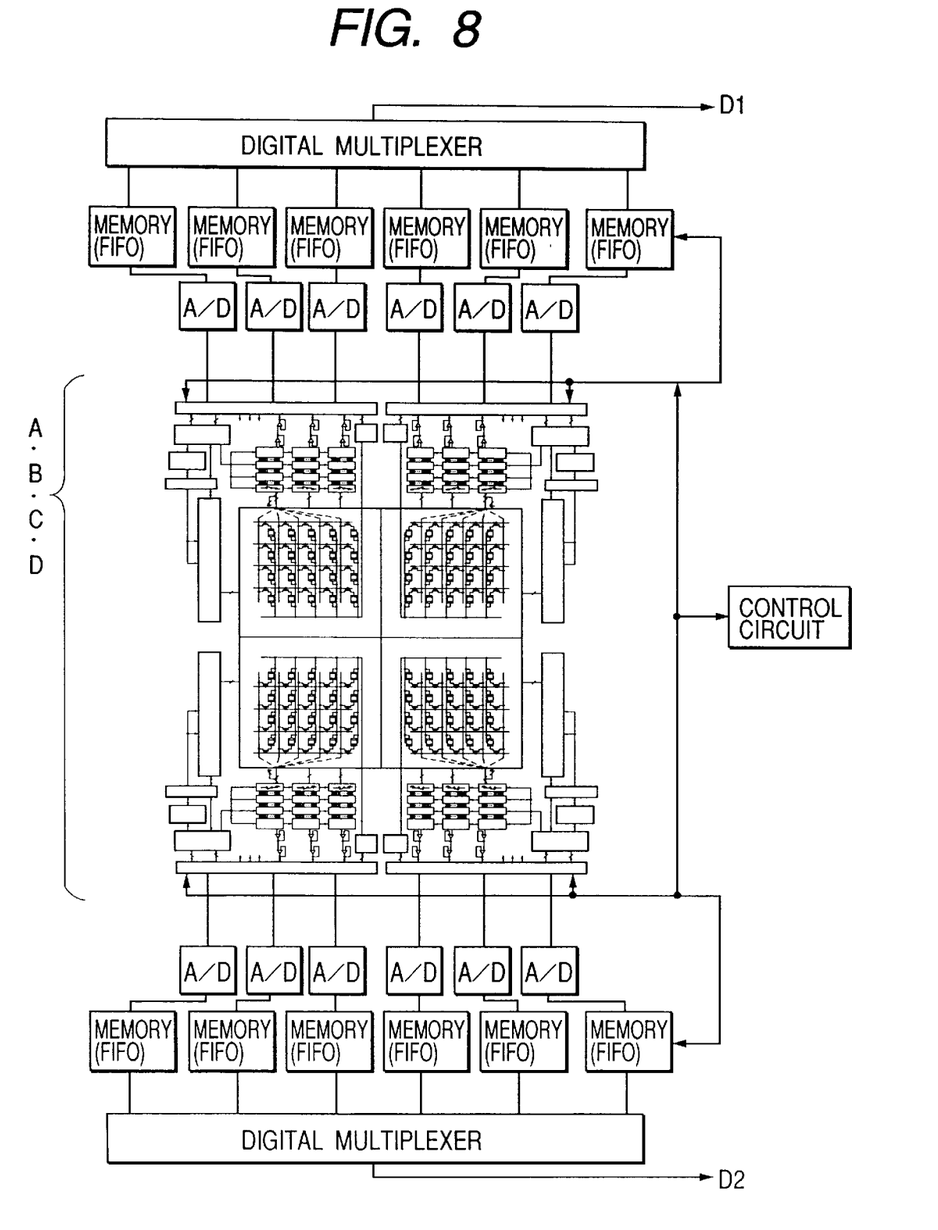
FIG. 8 is a schematic circuit diagram for explaining another preferred example of the photoelectric conversion device.

FIG. 7 and FIG. 8 are a schematic structural diagram and a schematic circuit diagram of the photoelectric conversion device according to the third example of the present invention.

FIG. 7 is a schematic structural diagram of the photoelectric conversion device, which is a large-area photoelectric conversion device constructed by bonding four panels A, B, C and D without a clearance. In the figure, numerals 1100, 2100, 3100 and 4100 designate pixel element groups in the respective panels. CP2 represents ICs composed of reset switches, amplifiers, S/H circuits, and analog multiplexer. Each IC includes 128 sets of reset switches, amplifiers, and S/H circuits, and a quarter analog multiplexer. The quarter analog multiplexer herein means a small 128-input analog multiplexer, which is an analog multiplexer in four ICs being capable of composing a large analog multiplexer capable of handling 512 inputs. CP1 represents shift register ICs, and large shift registers of 1376 stages are composed by connecting eleven shift register ICs in series. DB2 indicates PCB (printed circuit board) consisting of a controller, a reference voltage generator and a pulse generator, and DB1 indicates PCB consisting of wires for supplying signals and power to CP1. CRL denotes a control circuit for controlling each of the panels.

CP2 of panel A includes eleven ICs, which are grouped into three groups, each including three ICs, four ICs and four ICs, respectively, from the right, and 352, 512 and 512 signal wires SIG being connected to each group, respectively. The rightmost IC includes inputs of GND lines as thirty two dummy wires. The electrical circuitry is the same as that in the first example or in the second example.

Panel B has the mirror structure of panel A (left-to-right inverted structure). Panel C has the same structure as panel A, and panel D has the same structure as panel B. Thus, the combination of panel A with panel C and the combination of panel B with panel D have the point symmetry structure around the center at a point of contact among the four panels. The four panels are bonded to one another, thereby composing one large panel. It is, however, noted that a clearance of spacing of pixel elements, for example, of one row (or one column) is created between the panels, for facilitating bonding.

FIG. 8 is a schematic circuit diagram of the photoelectric conversion device. Six A/D converters and six memories functioning as buffers are provided for two panels, panels A and B, and outputs of these memories are given as one digital output D1 from a digital multiplexer. The memories herein are so-called FIFO (First In First Out) type memories from which first input information is outputted first. These two panels in the upper part operate as if they were one middle panel. This one middle panel herein is constructed so that the number of groups N=3, the number of columns n=1376×2=2752, Tad=0.15 μsec, and Ttft=78 μsec. These conditions satisfies the following relationship.

$$n \times Tad/Ttft \leq N > n \times Tad/Ttft+1$$

It is thus seen that this device is the low-cost photoelectric conversion device with high S/N and good operability.

Likewise, the two panels in the lower part are provided with six A/D converters and six memories functioning as buffers, and outputs from these memories are given as one digital output D2 from a digital multiplexer. These two panels in the lower part also operate as if they were one middle panel.

Figure 9A:
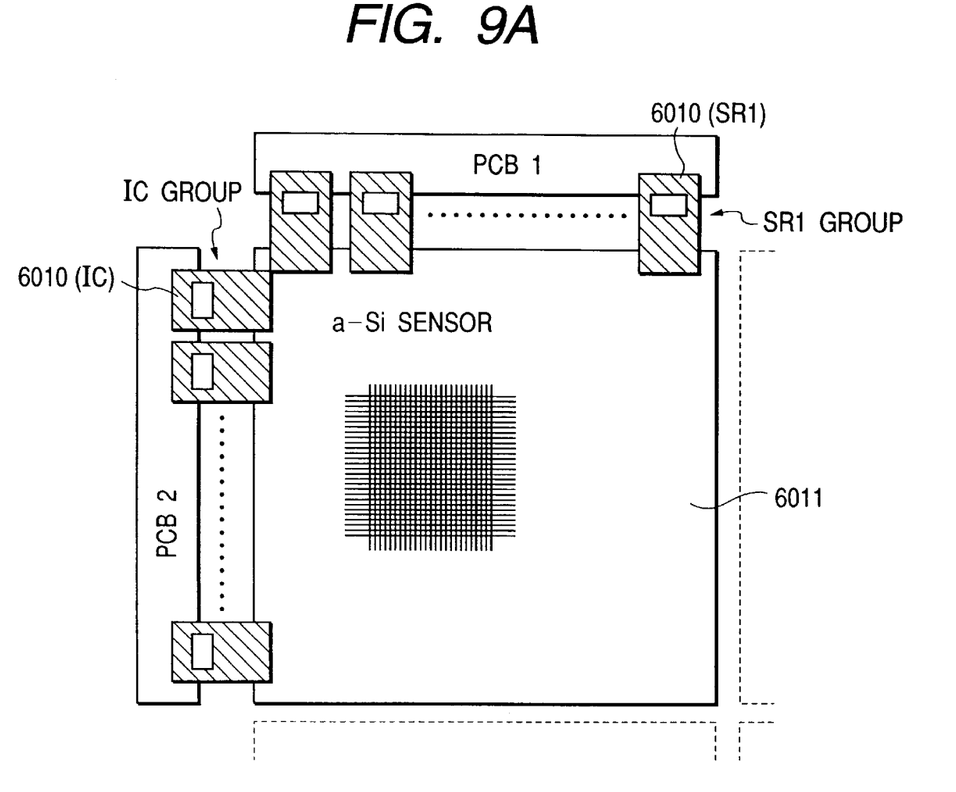
FIG. 9A is a schematic plan view for explaining a preferred structural example of the photoelectric conversion device.
Figure 9B:
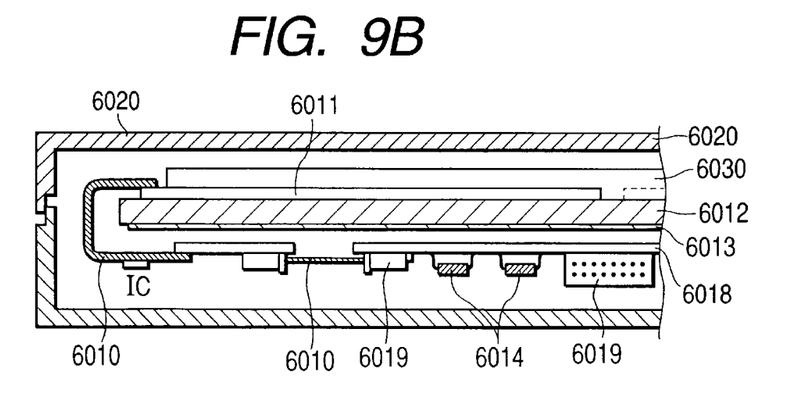
FIG. 9B is a schematic cross-sectional view for explaining the preferred structural example of the photoelectric conversion device.

FIG. 9A and FIG. 9B are a schematic structural plan diagram and a schematic sectional diagram of an application in which the present invention is applied to a photoelectric conversion device for X-ray detection.

A plurality of photoelectric conversion elements and TFTs are formed in a-Si sensor substrate 6011, and flexible circuit boards 6010 on which shift registers SR1 or integrated circuits IC for detection are mounted are connected to the substrate 6011. The other sides of the flexible circuit boards 6010 are connected to a circuit board PCB1 (SR1 GROUP) or are connected to a circuit board PCB2 (IC GROUP). A plurality of a-Si sensor substrates 6011 described above are bonded onto a base 6012 to compose a large photoelectric conversion device, and a lead plate 6013 is mounted for protecting memories 6014 in processing circuit 6018 from X-rays. Fluorescent material 6030, for example CsI, for converting X-rays to visible light is applied or bonded onto the a-Si sensor substrates 6011. As illustrated in FIG. 9B, the whole is mounted in carbon fiber case 6020.

Figure 10:
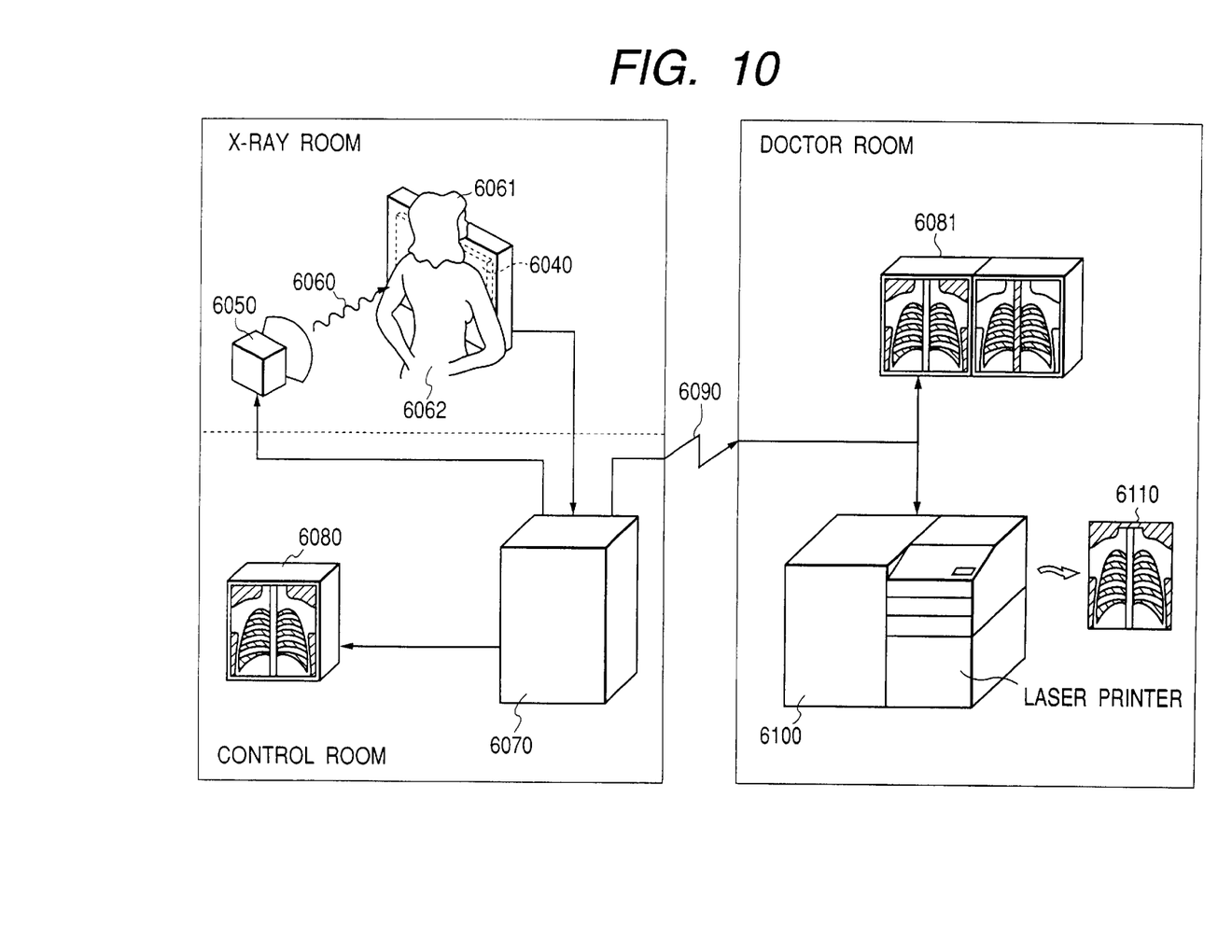
FIG. 10 is a schematic system structural diagram for explaining a form of a system that can be applied to nondestructive inspection using the photoelectric conversion device.

FIG. 10 is an application example of the photoelectric conversion device of the present invention to an X-ray diagnosis system.

X-rays 6060 generated in X-ray tube 6050 pass through chest 6062 of a patient or a person to be observed 6061 to enter the photoelectric conversion device 6040 on which the fluorescent material is mounted. The incident X-rays include information of the inside of the body of patient 6061. The fluorescent material brings about luminescence in response to incidence of the X-rays, and this light is converted to electrical information by photoelectric conversion. This information is converted to digital data, and the digital data is subjected to image processing in image processor 6070 to be observed in display 6080 placed in a control room.

This information can also be transmitted through transmission means such as a telephone line 6090 to a remote place to be displayed on display 6081 or stored in storage means such as an optical disk in a doctor room at the other place, whereby a doctor at the remote place can make a diagnosis. The information can also be recorded in film 6110 by film processor 6100.

The present invention is not limited to the pixel configurations of the examples described above, but the pixels may also be arranged in other configurations as long as they satisfy the requirements that a plurality of pixels can be arranged in the row and column directions, outputs of the pixels (photoelectric conversion pixels) in the respective columns can be connected to each of a plurality of signal wires, respectively, and control terminals for controlling the signal output operation of the pixels in the respective rows can be connected to each of a plurality of control lines, respectively. The structure of the photoelectric conversion elements is not limited particularly to that of the above examples, either. Further, the above examples were constructed in such structure that the analog conversion means was connected to each of the signal wires, but the analog conversion means may be provided for every pixel.

As detailed above, the present invention can provide the low-cost photoelectric conversion device with high S/N ratios and good operability and a low-cost system capable of obtaining digital information in a large area and with high S/N ratios necessary for the X-ray pickup system or the like.

What is claimed is:

1. A photoelectric conversion device comprising:
    a photoelectric conversion portion comprising a plurality of photoelectric conversion pixels arranged in row and column directions, a plurality of signal wires wired in the column direction, each of the signal wires connecting outputs of the photoelectric conversion pixels arranged in the same column, and a plurality of control lines wired in the row direction, each of the control lines connecting control terminals for controlling signal output operation of the photoelectric conversion pixels arranged in the same row;
    a plurality of analog memory means for storing an analog voltage obtained from analog voltage conversion means for converting an information charge based on the photoelectric conversion pixels to the analog voltage, each of the analog memory means being connected to at least one of the signal wires and each of the signal wires being connected to at least one of the analog memory means; and
    a plurality of A/D conversion means each connected to at least one output of at least one of a plurality of analog switch means, each of the analog switch means being connected to at least one of a plurality of output line groups which are formed by dividing output lines of each of the analog memory means into a plurality of groups,
    wherein, when the plurality of output line groups are composed of N groups of output lines, the photoelectric conversion pixels are arranged in n columns, a conversion time of the A/D conversion means is Tad second, and a time for conversion of the information charge outputted from the photoelectric conversion pixel to the analog voltage through the analog voltage conversion means is Ttft second, then N satisfies the condition:

$$N \geq n \times Tad/Ttft.$$

2. The photoelectric conversion device according to claim 1, wherein N satisfies the condition:

$$n \times Tad/Ttft \leq N < n \times Tad/Ttft+1.$$

3. The photoelectric conversion device according to claim 1, wherein the photoelectric conversion pixel has a photoelectric conversion element and a switching element for controlling the signal output operation of the photoelectric conversion element, and wherein a control terminal of the photoelectric conversion pixel is a control terminal of the switching element.

4. A photoelectric conversion device comprising:
    a plurality of photoelectric conversion pixels arranged in row and column directions;
    a plurality of signal wires wired in the column direction, each of the signal wires connecting outputs of the photoelectric conversion pixels arranged in the same column;
    a plurality of control lines wired in the row direction, each of the control wires connecting control terminals for controlling signal output operation of the photoelectric conversion pixels arranged in the same row;

analog voltage conversion means for converting an information charge in the photoelectric conversion pixels to an analog voltage;

analog memory means for storing and maintaining as an output the analog voltage converted from the information charge based on the photoelectric conversion pixels by the analog voltage conversion means, the analog memory means being connected to each of the signal wires;

respective ones of a plurality of analog switch means each connected to a respective one of output line groups which are formed by dividing output lines of the analog memory means;

respective ones of a plurality of A/D conversion means each connected to an output of a respective one of the analog switch means;

respective ones of buffer memories each connected to a respective one of the A/D conversion means; and a multiplexer connected to the buffer memories, wherein the plurality of output line groups are composed of N groups of output lines, the photoelectric conversion pixels are arranged in n columns, a conversion time of the A/D conversion means is Tad second, and a time for conversion of the information charge outputted from the photoelectric conversion pixel to the analog voltage through the analog voltage conversion means is Ttft second, then N satisfies the condition:

$$N \geq n \times Tad/Ttft.$$

5. The photoelectric conversion device according to claim 4, wherein the buffer memories are First In First Out type memories.

* * * * *